(12) United States Patent
Furuya

(10) Patent No.: US 6,839,180 B2
(45) Date of Patent: Jan. 4, 2005

(54) COMBINER AND ON-VEHICLE DISPLAY UNIT INCLUDING THE SAME

(75) Inventor: Yoshiyuki Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 45 days.

(21) Appl. No.: 10/347,226

(22) Filed: Jan. 21, 2003

(65) Prior Publication Data

US 2003/0169506 A1 Sep. 11, 2003

(30) Foreign Application Priority Data

Mar. 5, 2002 (JP) ........................................ 2002-058746
Mar. 5, 2002 (JP) ........................................ 2002-058747

(51) Int. Cl.[7] ............................................. G02B 27/14
(52) U.S. Cl. ..................................... 359/630; 359/883
(58) Field of Search ................................ 359/630, 502, 359/580, 583, 586, 883, 884; 353/50

(56) References Cited

U.S. PATENT DOCUMENTS

| | | | | |
|---|---|---|---|---|
| 4,448,491 A | * | 5/1984 | Okubo ........................ | 349/155 |
| 5,856,860 A | | 1/1999 | Bhalakia et al. ............ | 351/168 |
| 6,137,630 A | * | 10/2000 | Tsou et al. .................. | 359/586 |
| 6,259,559 B1 | * | 7/2001 | Kobayashi et al. ......... | 359/485 |
| 6,563,649 B2 | * | 5/2003 | Furuya ....................... | 359/630 |
| 6,768,592 B2 | * | 7/2004 | Wilmington ................ | 359/634 |
| 2002/0060864 A1 | * | 5/2002 | Mertsching et al. ........ | 359/839 |

FOREIGN PATENT DOCUMENTS

| | | | | |
|---|---|---|---|---|
| DE | 4227582 A1 | * | 2/1993 | .............. B60J/1/06 |
| GB | 2 365 998 | | 2/2002 | |
| JP | 60-17403 | | 1/1985 | |
| JP | 10-161029 | | 6/1998 | |
| JP | 10-170709 | | 6/1998 | |
| JP | 10-186134 | | 7/1998 | |
| JP | 2000075239 A | * | 3/2000 | ........... G02B/27/02 |
| JP | 2001-277285 | | 10/2001 | |
| JP | 2002-315339 | | 10/2002 | |

OTHER PUBLICATIONS

Search Report for Corresponding British Patent Application No. GB 0301359.6 dated Jul. 24, 2003.

Copy of German Patent Application Office Action with translation for corresponding German Patent Application No. 103 03 240.1–51 dated Apr. 29, 2004.

* cited by examiner

*Primary Examiner*—Ricky Mack
(74) *Attorney, Agent, or Firm*—Armstrong, Kratz, Quintos, Hanson & Brooks, LLP

(57) ABSTRACT

The combiner 1 has a resin base 11 and a reflecting and polarizing member 12. The reflecting and polarizing member 12 is unitarily molded with the resin base 11 as an insert and has a polarizer plate 12A covered by a reflector film 12B. At a border B of the reflector member 12 with the resin base 11, a gradation printed layer 13a is provided. Preferably, the reflector film has an undercoat layer 12d, a reflecting coat layer 12e, an overcoat layer 12f, and a top coat layer 12g. The undercoat layer prevents the reflector film from being stripped out of the polarizer plate, and the reflector film has a predetermined reflectance. The reflecting coat layer is protected by the overcoat layer, and the top coat layer has a water repellency.

6 Claims, 6 Drawing Sheets

COMBINER AND ON-VEHICLE DISPLAY UNIT INCLUDING THE SAME

BACKGROUND OF THE INVENTION

1. Field of the Invention

The present invention relates to a combiner (half transparent reflector) reflecting an image supplied from an on-vehicle display so that a driver can see a virtual one of the displayed image. The invention also relates to an on-vehicle display unit having the combiner as well as a manufacturing method of the combiner.

2. Related Art

Such on-vehicle display units are generally called as a heap-up display. The heap-up display can superpose additional information required for operation of a motor vehicle and a foreground of the vehicle so that a driver can see the information with little turn of his eye during the operation of the vehicle.

FIG. 12 is a general constitutional view showing a conventional on-vehicle display unit of such a type. In FIG. 12, the on-vehicle display unit has a display 2 disposed in an instrument panel 8 positioned under a windshield 7 of a motor vehicle. The display 2 is provided with a displaying device 3 having a screen facing upward. A displayed image of the displaying device 3 passes through a prism assembly 4 and a pair of polarizer plates 5 and 6 and is reflected by a combiner 1 so that a virtual one I of the displayed image can be seen by a driver's eye E. The prism assembly 4 consists of a first prism 4a and a second prism 4b which are disposed close to each other, and the first prism 4a has a vertex oriented opposite to that of the second prism 4b. The polarizer plate 5 has a polarizing axis perpendicular to that of the polarizer plate 6.

The combiner 1 used in the on-vehicle display unit of FIG. 12 has a reflector film fitted on a resin base with a transparent adhesive, and the polarizer plate 6 is fitted to the combiner 1 with a transparent adhesive.

However, the combiner 1 is configured not only in a flat plate but also in a concave shape for positioning the virtual image I with a longer distance from the driver's eye. Thereby, the driver can see the virtual image I and a foreground of the vehicle simultaneously with ease. It has been a difficult work to precisely fit a reflector film on the concave surface.

The transparent adhesive for binding the resin base and the reflector film as well as for binding the combiner 1 and the polarizer plate 6 disadvantageously tends to decease transparency thereof under a hot and high humidity atmosphere.

The combiner 1 and the polarizer plate 6 are formed in separate bodies, which increases a manufacturing cost thereof.

SUMMARY OF THE INVENTION

In view of the foregoing disadvantages of the conventional art, an object of the invention is to provide a combiner and a manufacturing method thereof, which are easily accomplished with a lower cost. The combiner is better in design and can be incorporated in an on-vehicle display unit.

For achieving the object, a first aspect of the present invention is a combiner comprising a resin base and a reflecting member, wherein the reflecting member is unitarily molded with the resin base and has a polarizer plate covered by a reflector film. The combiner can be easily manufactured with a lower cost.

Preferably, the reflecting member has an undercoat layer, a reflecting coat layer, an overcoat layer, and a top coat layer. This allows the combiner to have an appropriate reflectance and a higher transparency.

Preferably, the undercoat layer prevents the reflecting coat layer from being stripped out of the polarizer plate, and the reflecting coat layer has a predetermined reflectance. The reflecting coat layer is protected by the overcoat layer, and the top coat layer has a water repellency. Thus, the reflector film is not exposed outward, causing no damage of the reflector film.

For achieving the object, a second aspect of the present invention is a combiner manufacturing method comprising the steps of:

sequentially layering an undercoat layer, a reflecting coat layer, an overcoat layer, and a top coat layer on a surface of a polarizer plate to define a reflecting member, arranging the reflecting member as an insert at a predetermined position in a cavity of a molding die for forming the combiner, and injecting a molten thermoplastic resin base material in the molding die before cooling the base material for solidification.

The combiner can be easily manufactured with a lower cost.

Preferably, the undercoat layer prevents the reflecting coat layer from being stripped out of the polarizer plate, and the reflecting coat layer has a predetermined reflectance, the reflecting coat layer being protected by the overcoat layer, the top coat layer having a water repellency. Thus, the reflector film is not exposed outward, causing no damage of the reflector film.

Preferably, the method comprises the step of arranging a polarizer resin film as an insert at a predetermined position in a cavity of a molding die before injecting a thermoplastic resin in the molding die to cool the thermoplastic resin for forming the polarizer plate. This method provides the polarizer plate having a better transparency.

For achieving the object, a third aspect of the present invention is an on-vehicle display unit comprising:

a display device, a prism assembly having a first prism and a second prism that are disposed in front of a screen of the display device, the first and second prisms being layered such that the first prism has a vertex oriented opposite to that of the second prism, a combiner for reflecting and guiding display rays toward a diver's eye, the display rays delivered through the prism assembly from the display device, wherein the combiner comprises a resin base and a reflecting member, and the reflecting member is unitarily molded as an insert with the resin base and has a polarizer plate covered by a reflector film, and a second polarizer plated is disposed between the prism assembly and the combiner, the second polarizer plate being perpendicular to the polarizer plate of the combiner in polarizing axes.

This provides the on-vehicle display unit which is easily manufactured with a lower cost. The display unit eliminates an adverse effect of an external light like sun beams.

For achieving the object, a fourth aspect of the present invention is a combiner comprising a resin base and a reflecting member, wherein the reflecting member is unitarily molded with the resin base and has a polarizer plate covered by a reflector film. A gradation print layer is provided between the resin base and the reflecting member.

Thus, the combiner can be easily manufactured with a lower cost. The combiner is better in design, since a border of the reflector member with the resin base is provided with the gradation.

Preferably, the reflecting member has an undercoat layer, a reflecting coat layer, an overcoat layer, and a top coat layer. This allows the combiner to have an appropriate reflectance and a higher transparency.

Preferably, the undercoat layer prevents the reflecting coat layer from being stripped out of the polarizer plate, and the reflector film has a predetermined reflectance, the reflector film being protected by the overcoat layer, the top coat layer having a water repellency. This prevents the reflector film from being stripped out of the polarizer plate, and the reflector film is not exposed outward, causing no damage of the reflector film.

For achieving the object, a fifth aspect of the present invention is a combiner manufacturing method comprising the steps of:

masking a polarizer plate with a mask having a first masking section and a second masking section, the first masking section having an opening slightly smaller than the polarizer plate, the second masking section having a masking pattern which is constituted by a plurality of circles or stripes that are spaced from each other such that a masking ratio of the masking pattern becomes gradually smaller inwardly from an inner periphery of the opening of the first masking section, sequentially layering an undercoat layer, a reflecting coat layer, a overcoat layer, and a top coat layer on the polarizer plate through coating processes to define a polarizing and reflecting member, arranging the polarizing and reflecting member as an insert at a predetermined position in a cavity of a molding die for forming the combiner, injecting a molten thermoplastic resin base material in the molding die before cooling the base material for solidification, and removing the mask and providing a gradation print layer on a portion of the polarizer plate which has been covered by the mask in the masking step.

The combiner can be easily manufactured with a lower cost. The combiner is better in design, since a gradation is provided at a border of the reflector member with the resin base.

Preferably, the undercoat layer prevents the reflecting coat layer from being stripped out of the polarizer plate, and the reflecting coat layer has a predetermined reflectance, the reflecting coat layer being protected by the overcoat layer, the top coat layer having a water repellency. This prevents the reflector film from being stripped out of the polarizer plate, and the reflector film is not exposed outward, causing no damage of the reflector film.

Preferably, the method comprises the step of arranging a polarizer resin film as an insert at a predetermined position in a cavity of a molding die before injecting a thermoplastic resin in said molding die to cool the thermoplastic resin for forming the polarizer plate. This provides the polarizer plate having a better transparency.

For achieving the object, a sixth aspect of the present invention is an on-vehicle display unit comprising:

a display device, a prism assembly having a first prism and a second prism that are disposed in front of a screen of the display device, the first and second prisms being layered such that the first prism has a vertex oriented opposite to that of the second prism, a combiner for reflecting and guiding display rays toward a diver's eye, the display rays delivered through the prism assembly from the display-device, and a second polarizer plated is posed between the prism assembly and the combiner, the second polarizer plate being perpendicular to the polarizer plate of the combiner in polarizing axes, wherein the combiner comprises a resin base and a reflecting member, the reflecting member unitarily molded as an insert with the resin base and having a polarizer plate covered by a reflector film, and a gradation print layer is provided between the resin base and the reflecting member.

This method provides the on-vehicle display unit which is easily manufactured with a lower cost. The display unit eliminates an adverse effect of an external light like sun beams.

DETAILED DESCRIPTION OF PREFERRED EMBODIMENTS

Referring to the accompanied drawings, embodiments of the present invention will be discussed hereinafter.

Figure 1:
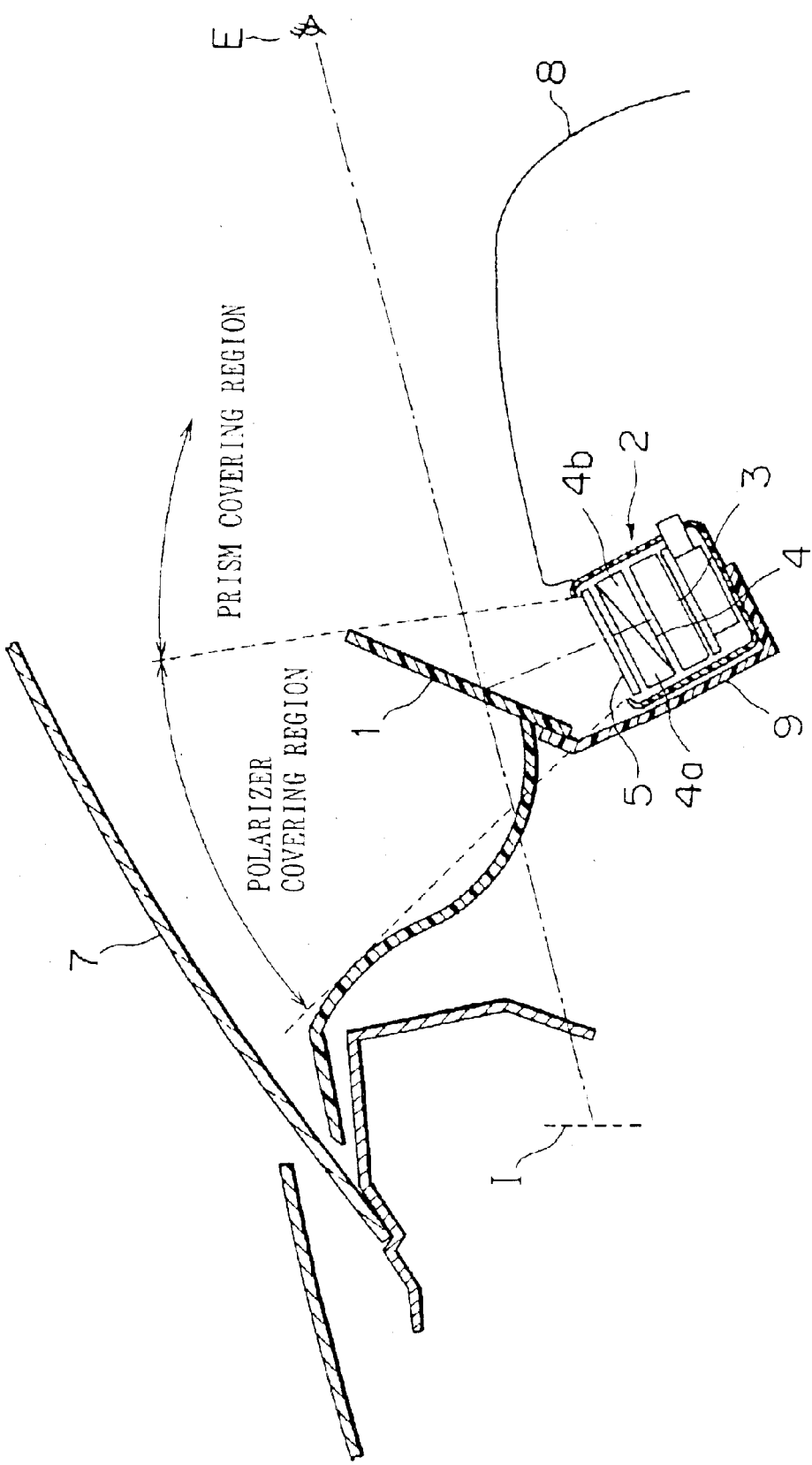
FIG. 1 is a general constitutional view showing an embodiment of an on-vehicle display unit using a combiner according to the present invention.

FIG. 1 is a general constitutional view showing an embodiment of an on-vehicle display unit having a combiner according to the present invention. The on-vehicle display unit has a display 2 disposed in an instrument panel 8 positioned under a windshield 7 of a motor vehicle. The display 2 is provided with a displaying device 3 having a screen faced upward, a prism assembly 4 consisting of a pair of first and second prisms 4a and 4b, and a polarizer plate 5 positioned above the prism assembly 4. The first and second prisms 4a and 4b are the same in shape, each of which is positioned close to each other such that a vertex of one of the prisms faces opposite to that of the other. Above the display 2, a combiner 1 is provided to be fitted to a tip of a support 9 secured to the display 2, and the combiner 1 forms a predetermined angle with the screen of the displaying device 3.

Figure 2A:
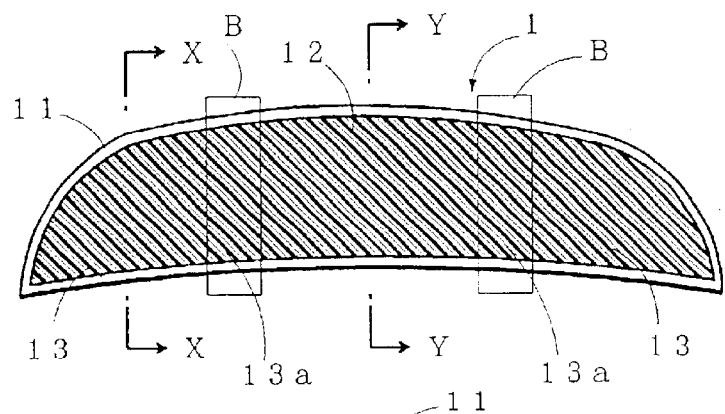
FIGS. 2A, 2B, and 2C are sequentially a front view, a sectional view taken along line X—X of FIG. 2A, and a sectional view taken along line Y—Y of FIG. 2A of a combiner according to the present invention.
Figure 2B:
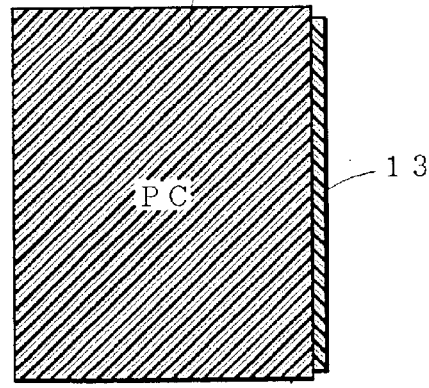
Figure 2C:
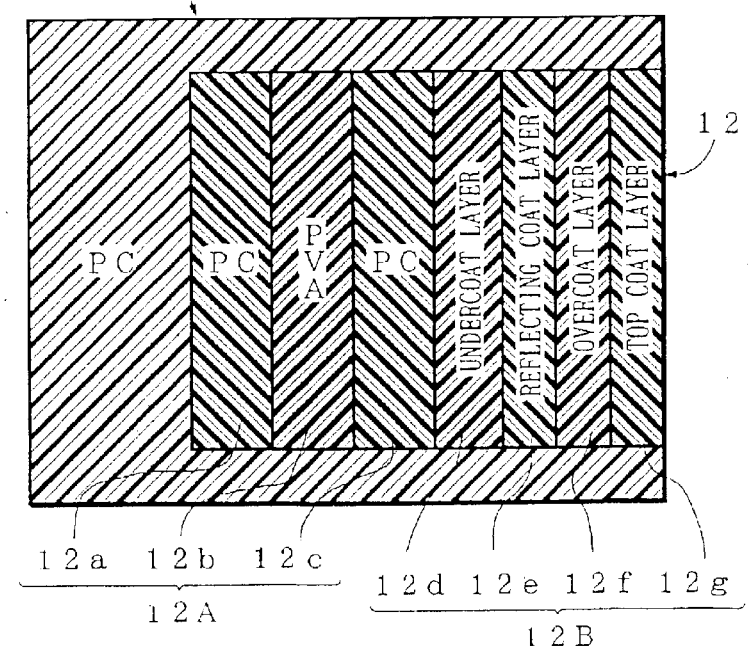

As illustrated in FIG. 2, the combiner 1 consists of a laterally elongated, generally trapezoidal resin base 11 and a generally rectangular polarizing and reflecting member 12 positioned at a middle of the resin base 11. The polarizing and reflecting member 12 is molded in the resin base 11 through an inserting process.

The polarizing and reflecting member 12 has a polarizer plate 12A and a reflector film 12B and is manufactured as discussed later. The polarizer plate 12A consists of three layers of a PC (polycarbonate) layer 12a, a PVA (polyvinyl alcohol) layer 12b, and a PC layer 12c. The reflector film 12B is configured by layering an undercoat layer 12d, a reflecting coat layer 12e, an overcoat layer 12f, and a top coat layer 12g.

The resin base 11 is provided with a dot printed layer 13 in a peripheral area thereof. A gradation printed layer 13a is provided in a border B of the reflector member 12 with the resin base 11 to be contiguous with the dot printed layer 13.

Figure 3:
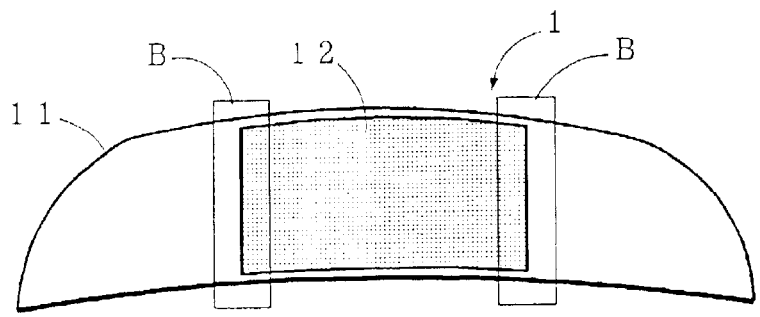
FIG. 3 is a view for explaining a manufacturing method of the combiner.

Next, a manufacturing method of the combiner 1 according to the present invention will be discussed. The combiner 1 is defined by inserting the generally rectangular reflector member 12 into the laterally elongated, generally trapezoidal resin base 11. Thus configured combiner 1 has a lower transparency with respect to the polarizer plate 12A, since the polarizer made of the PVA has a transparency of about 30%. As illustrated in FIG. 3, between the resin base 11 and the reflector member 12, a border line is clearly recognized between a transparent portion and the lower transparency portion (30% transparency portion).

To eliminate such a border line, the combiner 1 may be made of the PVA layer 12b as a whole. However, this increases a manufacturing cost of the combiner 1, since the polarizer plate 12A has a larger area.

Therefore, the polarizer plate 12A of the combiner 1 desirably has a minimum size, and the remaining part is made of a transparent (or smoky) resin base 11. A border of the polarizer plate 12A with the resin base 11 is provided with a gradation not to clearly recognized, enabling a better appearance.

Thus, the present invention provides a combiner 1 having a border line which is provided with a gradation not to be clearly recognized.

Figure 4:
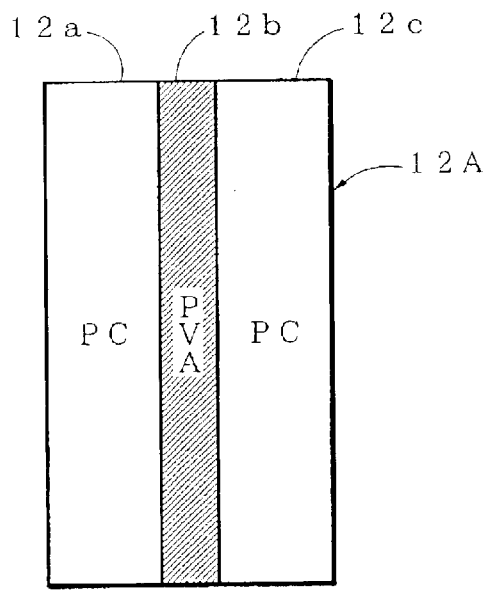
FIG. 4 is a view for explaining a manufacturing method of the combiner.
Figure 6:
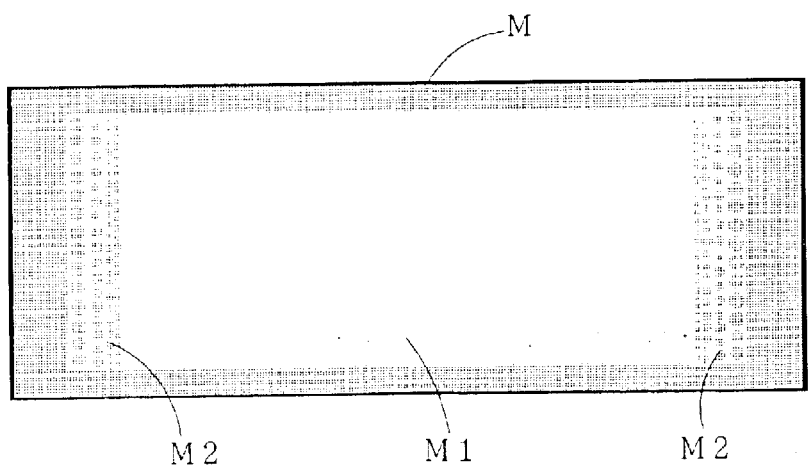
FIG. 6 is a general front view showing a mask used in the manufacturing method according to the present invention.

Next, referring to FIGS. 4 to 11, a manufacturing method of the combiner 1 according to the present invention will be discussed in detail. At a predetermined position in a molding die having a cavity for forming a PC (polycarbonate) layer 12a, a PVA (polyvinyl alcohol) firm is disposed as an insert to define the polarizer plate 12A shown in FIG. 4. Then, a molten thermoplastic resin such as a PC (polycarbonate) having a reflectance less than 5% is injected into the molding die, and the thermoplastic resin is cooled for solidification. This completes the polarizer plate 12A having three layers constituted by the PC layer 12a, the PVA layer 12b of a polarizer, and the PC layer 12c as illustrated in FIG. 4. The PC layer 12a and the PC layer 12c may be molded at the same step or at separate steps.

Figure 5:
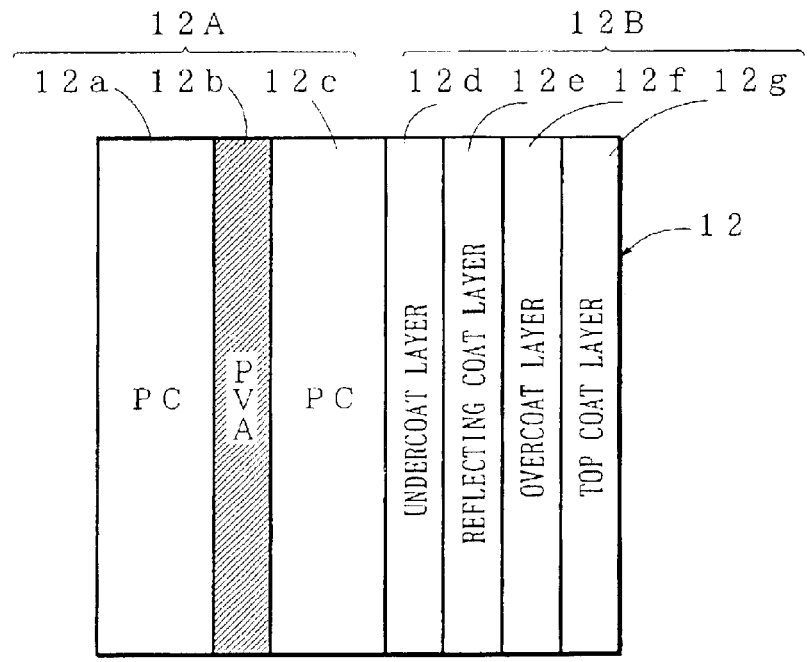
FIG. 5 is a view for explaining a manufacturing method of the combiner.

Then, on an outer surface of the PC layer 12c of the molded polarizer plate 12A, the undercoat 12d, the reflecting coat layer 12e, the overcoat layer 12f, and the top coat layer 12g are sequentially coated and layered to define the polarizing and reflecting member 12 including the reflector film 12B as illustrated in FIG. 5.

The undercoat 12d is made of an acrylic resin for surely close-contacting the reflecting coat layer 12e to the PC layer 12c to prevent the stripping of the reflecting coat layer 12e from the polarizer plate 12A. The reflecting coat layer 12e is made of a reflection material such as $TiO_2$ (titanium dioxide) $ZrO_2$ (zirconium dioxide), and Cr (chromium) to have a predetermined reflectance, for example, of 20%. The overcoat layer 12f is made of a material selected from a silicon group like $SiO_2$ to protect the reflecting coat layer 12e. The top coat layer 12g is made of a material, for example, selected from a silicon group and a fluorine group to have a water repellency.

In the coating processes described above, as illustrated in FIG. 6, a mask M having a first masking section M1 and a second masking section M2 is used. The first masking section M1 has an opening slightly smaller than the polarizer plate 12, and the second masking section M2 has a masking pattern which is constituted by a plurality of circles or stripes which are spaced from each other such that a masking ratio of the masking pattern becomes gradually smaller inwardly from an inner periphery of the opening of the first masking section. With masking of the mask M, sequentially layering the undercoat layer 12d, the reflecting coat layer 12e, the overcoat layer 12f, and the top coat layer 12g on an outer surface of the PC layer 12c of the polarizer plate 12A with coating processes is provided to obtain the reflector film 12B.

Figure 7:
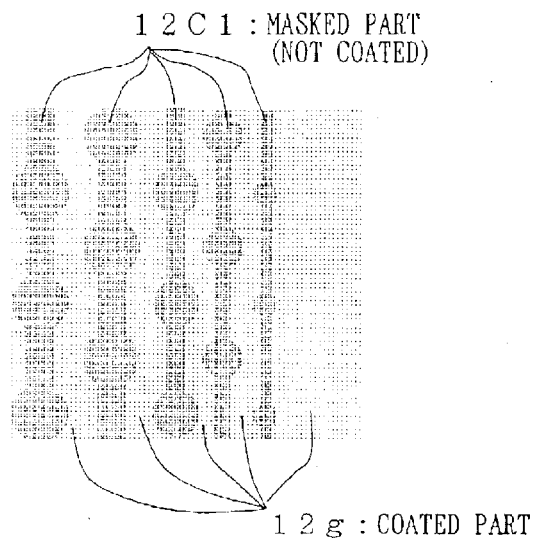
FIG. 7 is an enlarged view showing a surface of a polarizing and reflecting member which has been provided with a masking process and coating processes.

As illustrated in FIG. 7, the masking of the M2 defines a mask portion 12c1 (not coated) and a coated portion at a periphery of an outer surface of the PC layer 12c of the polarizer plate 12A which has been provided with coating processes. The mask portion 12c1 is defined in a pattern which is constituted by a plurality of circles or stripes that are spaced from each other such that a masking ratio of the masking pattern becomes gradually smaller inwardly from an inner periphery of the opening of the first masking section.

Figure 8:
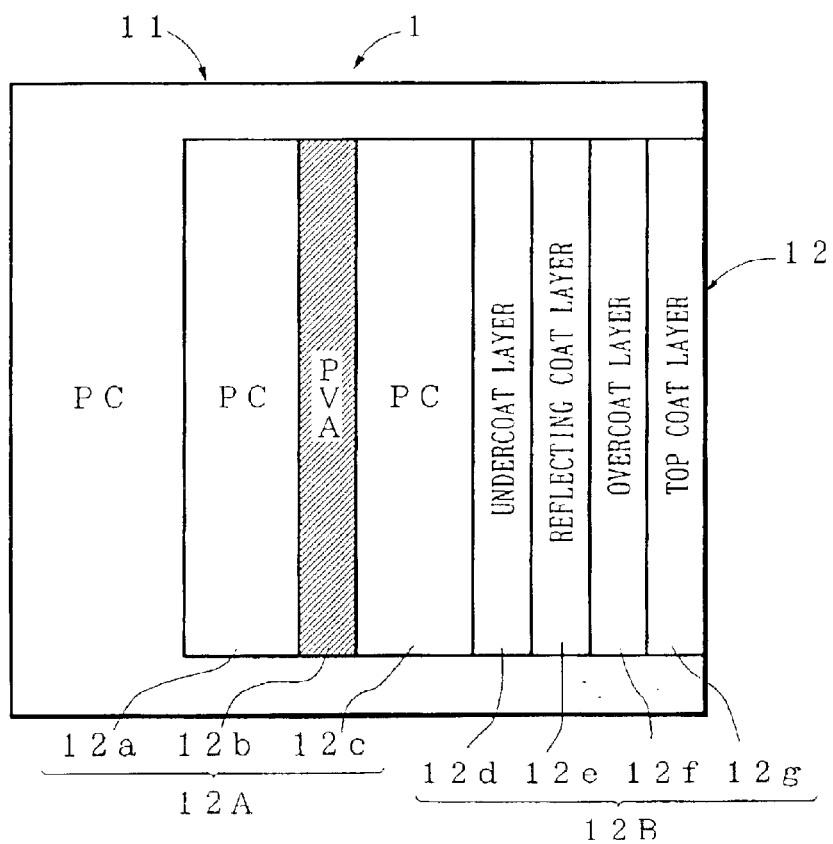
FIG. 8 is a view for explaining a manufacturing method of the combiner according to the present invention.

Next, the polarizing and reflecting member 12 is disposed as an insert at a predetermined position of a molding die having a cavity for molding a laterally elongated flat plate (or concave plate). Then, a molten PC (polycarbonate) having a reflectance less than 5% is injected into the molding die and cooled for solidification. This completes the combiner 1 as illustrated in FIG. 8. The combiner 1 has the polarizing and reflecting member 12 which is disposed at a middle position of the generally trapezoid resin base 11.

In thus formed combiner 1, as illustrated in FIG. 3, at the border B of the reflector member 12 with the resin base 11, a border line is still clearly recognized between a transparent portion and the lower transparency portion (30% transparency portion).

Figure 9:
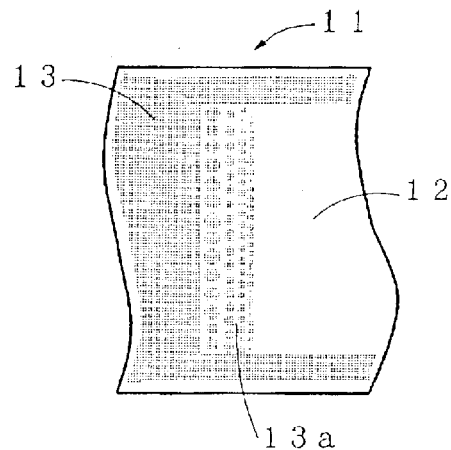
FIG. 9 is a view for explaining a printing process in a manufacturing method of the combiner according to the present invention.
Figure 10:
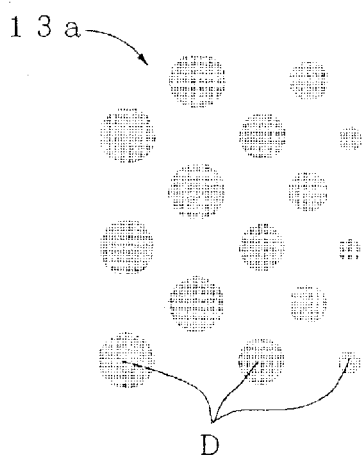
FIG. 10 is an enlarged view showing a gradation print layer defined by a printing process.

Therefore, as illustrated in FIG. 9, for the combiner 1, a printing process of a print device provides a dot printed layer 13 on a transparent portion of the resin base 11 at a periphery of the resin base 11 and a gradation printed layer 13a contiguous with the dot printed layer 13 around a border of the reflector member 12 with the resin base 11. A paint (or ink) used for defining the dot printed layer 13 and the gradation printed layer 13a has a transparency lower than the polarizer plate 12A, for example, of a black color. As illustrated in an enlarged view of the FIG. 10, the gradation printed layer 13a is defined by a plurality of dots D spaced from each other such that the masking ratio becomes gradually smaller from a periphery toward an inside of the reflector member 12.

Figure 11:
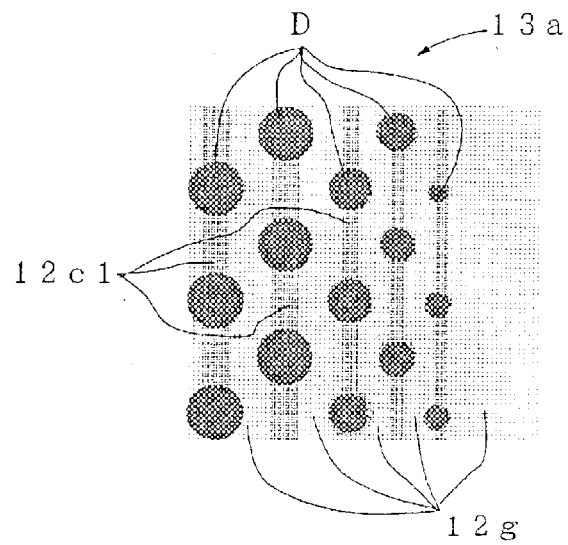
FIG. 11 is an enlarged view showing a surface of a polarizing and reflecting member; and, FIG. 12 is a general constitutional view showing a conventional on-vehicle display unit.
Figure 12:
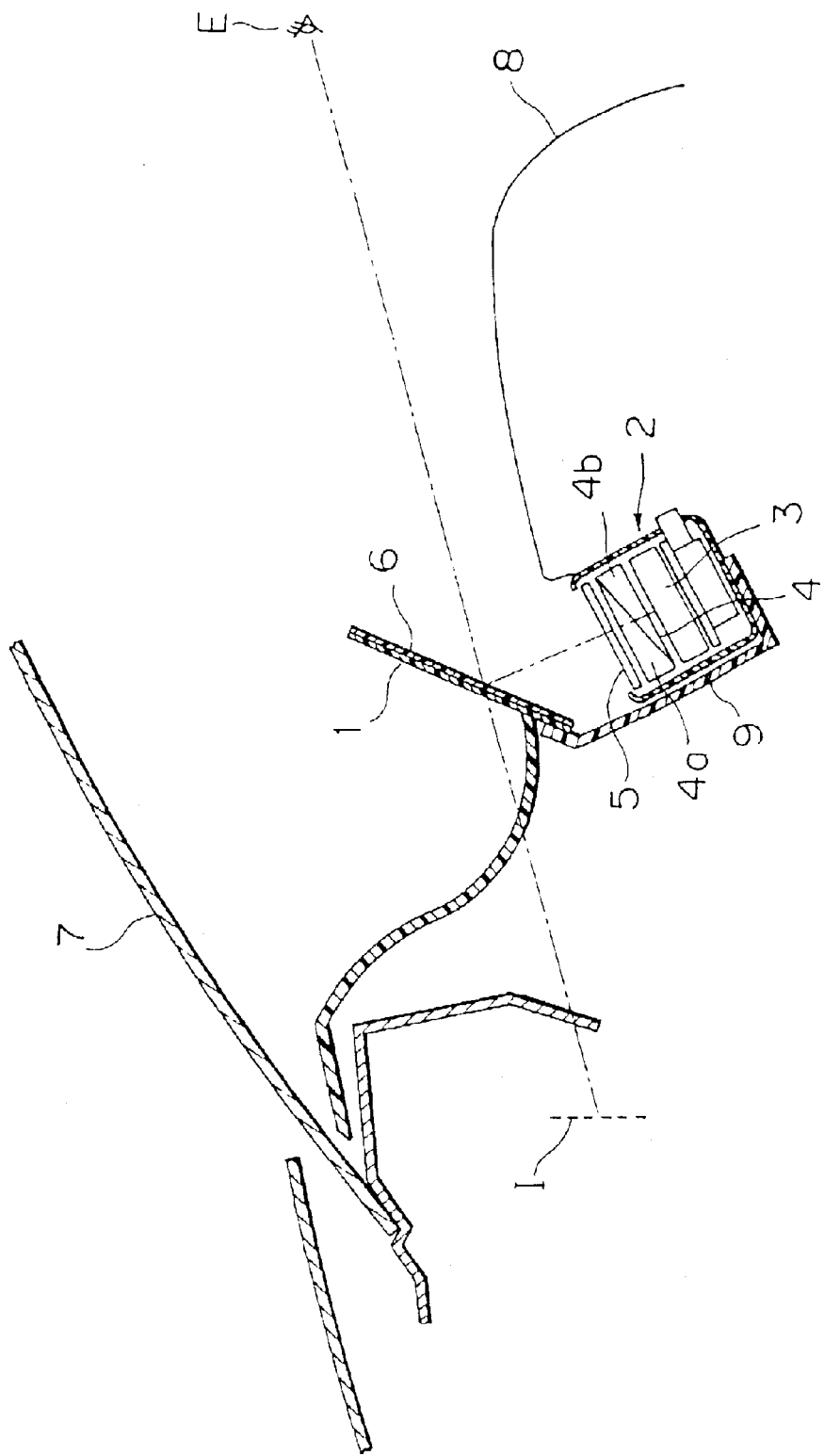

Each dot D of the gradation printed layer 13a is controlled to be positioned in a masked part 12c1 (having no coat) as illustrated in FIG. 11 which is an enlarged view of an surface of the combiner 1 that has been provided with a printing process.

This printing process finishes the combiner 1 according to the present invention. As illustrated in FIG. 2, in thus configured combiner. 1, the resin base 11 provided with the dot printed layer 13 has a transparency lower than that of a middle portion of the polarizer plate 12A of the reflector member 12. Furthermore, the gradation printed layer 13a provided at the border B gradates a border line between the resin base 11 and the reflector member 12 not to be clearly recognized.

Thus, the polarizing and reflecting member 12 constituted by fitting the reflector film 12B on the polarizer plate 12A is inserted to be unitarily formed with the resin base 11 to define the combiner 1. Thereby, the combiner 1 is easily manufactured with a lower cost to have an appropriate reflectance and a desired transparency. The combiner 1 according to the present invention is better in design, since the gradation printed layer 13a is provided at a border of the reflector member 12 with the resin base 11 to gradate the border line.

Referring again to FIG. 1, the polarizer plate 5 positioned above the prism assembly 4 has a polarizing axis perpendicular to that of the polarizer plate 12A of the combiner 1.

In thus configured on-vehicle display unit, display rays emitted from the displaying device 3 pass through the prism assembly 4 and the polarizer plate 5 and are reflected by the reflecting coat layer 12e of the combiner 1. Thereby, a driver's eye E can see a virtual image I of the display rays.

In FIG. 1, an external light such as sun beams enters an area which is influenced by the polarizer plates through the windshield 7. When the external light reaches the PVA layer 12b, the polarizer layer passes light components parallel to the polarizing axis of the PVA layer 12b but reflects light-components perpendicular to the polarizing axis of the PVA layer 12b. The light components having passed the PVA layer 12b reach the polarizer plate 5 through the combiner 1 and are reflected by the polarizer plate 5, since the polarizing axis of the polarizer plate 5 is perpendicular to the light components. Thus, the external light can not reach the screen of the displaying device 3, preventing an undesirable screen washout otherwise occurred.

Furthermore, in FIG. 1, through the windshield 7, an external light such as sun beams enters an area which is protected by the prisms. When the external light reaches the first prism 4a of the prism assembly 4, the light is reflected on a contacting surface of the first and second prisms 4a and 4b not to reach the screen of the displaying device 3, preventing an undesirable screen washout due to the external light. The prism assembly 4 has the pair of first and second prisms 4a and 4b which have the same shape as each other and are layered with their orientations being opposite to each other. Therefore, light emitting from the displaying device 3 passes through the first and second prisms with little effect thereof, so that a driver's eye can see rays emitted from the display as a virtual image positioned behind the combiner 1 forward from the vehicle.

The polarizing and reflecting member 12 of the on-vehicle display unit according to the present invention, which is constituted by fitting the reflector film 12B on the polarizer plate 12A, is inserted to be unitarily formed with the resin base 11 to define the combiner 1. Thereby, the combiner 1 is easily manufactured with a lower cost. The display unit having the combiner 1 according to the present invention is better in design, since a gradation is provided at a border of the reflector member 12 with the resin base 11.

The present invention is not limited in the embodiments described above but can provide various modified embodiments applied to different applications.

For example, to define the combiner 1, the thermoplastic resin constituting the resin base 11 and the polarizing and reflecting member 12 may be made of a material other than PC, and the polarizer may be made of a material other than a PVA.

What is claimed is:

1. A combiner manufacturing method comprising the steps of:
    masking a polarizer plate with a mask having a first masking section and a second masking section, the first masking section having an opening slightly smaller than the polarizer plate, the second masking section having a masking pattern-which is constituted by a plurality of circles or stripes that are spaced from each other such that a masking ratio of the masking pattern becomes gradually smaller inwardly from an inner periphery of the opening of the first masking section,
    sequentially layering an undercoat layer, a reflecting coat layer, an overcoat layer, and a top coat layer on the polarizer plate through coating processes to define a polarizing and reflecting member,
    arranging the polarizing and reflecting member as an insert at a predetermined position in a cavity of a molding die for forming the combiner,
    injecting a molten thermoplastic resin base material in the molding die before cooling the base material for solidification, and, and
    removing the mask and providing a gradation print layer on a portion of the polarizer plate which has been covered by the mask in the masking step.

2. The combiner manufacturing method as claimed in claim 1 wherein the undercoat layer prevents the reflecting coat layer from being stripped out of the polarizer plate, and the reflecting coat layer has a predetermined reflectance, the reflecting coat layer being protected by the overcoat layer, the top coat layer having a water repellency.

3. The combiner manufacturing method as claimed in claim 1 comprising the step of arranging a polarizer resin film as an insert at a predetermined position in a cavity of a molding die before injecting a thermoplastic resin in said molding die to cool the thermoplastic resin for forming the polarizer plate.

4. A combiner manufacturing method comprising the steps of:
    sequentially layering an undercoat layer, a reflecting coat layer, an overcoat layer, and a top coat layer on a polarizer plate through coating processes to define a polarizing and reflecting member,
    arranging the polarizing and reflecting member as an insert at a predetermined position in a cavity of a molding die for forming the combiner, and
    injecting a molten thermoplastic resin base material in the molding die before cooling the base material for solidification.

5. The combiner manufacturing method as claimed in claim 4 wherein the undercoat layer prevents the reflector film from being stripped out of the polarizer plate, and the reflector film has a predetermined reflectance, the reflector film being protected by the overcoat layer, the top coat layer having a water repellency.

6. The combiner manufacturing method as claimed in claim 4 comprising the step of arranging a polarizer resin film as an insert at a predetermined position in a cavity of a molding die before injecting a thermoplastic resin in said molding die to cool the thermoplastic resin for solidification to define the polarizer plate.

* * * * *